Dec. 17, 1929.  J. M. WEED  1,740,381

ELECTRIC ARC WELDING

Filed May 4, 1925

Inventor:
James M. Weed
by *His Attorney*

Patented Dec. 17, 1929

1,740,381

UNITED STATES PATENT OFFICE

JAMES M. WEED, OF SCOTIA, NEW YORK, ASSIGNOR TO GENERAL ELECTRIC COMPANY, A CORPORATION OF NEW YORK

ELECTRIC-ARC WELDING

Application filed May 4, 1925. Serial No. 27,628.

My invention relates to electric arc welding, and has for its principal object the provision of a welding apparatus comprising an improved means for stabilizing the arc during the welding operation.

In the arc welding of metal parts, it frequently happens that the magnetic permeance of the work and clamping mechanism is not uniform around the arc. Thus, where steel plates are being welded together upon a non-magnetic backing member, the permeance is greater at the side of the arc where the weld has been made than at the opposite side, since the open seam occurs on the latter side. The magnetic field set up in the plates by the welding current must complete its circuit through air across the open seam in front of the arc. This results in a high magnetic density in the air in front of the arc, while behind the arc most of the magnetic flux occupies the steel plates, passing from one plate to the other through the completed portion of the weld. This unbalanced condition of magnetic flux on opposite sides of the arc tends to cause a deflection of the arc toward the side where the field is weaker. The arc is thus deflected backwards along the completed weld. When the arc is near the end of the seam at the completion of the weld, this action is greatly increased, on account of the reduced permeance in advance of the arc, while at the beginning of the seam the action is actually reversed, due to the absence of magnetic material behind the arc. This deflection of the arc due to unbalance or non-uniformity of the surrounding magnetic field causes serious difficulties in welding. In accordance with my invention these difficulties are largely avoided, partly by the provision of a magnetic backing member, and partly by means of a yoke of magnetic material on the side of the arc where the free field would be strongest without said yoke.

My invention will be better understood from the following description when considered in connection with the accompanying drawing and its scope will be pointed out in the appended claims.

Figure 1:
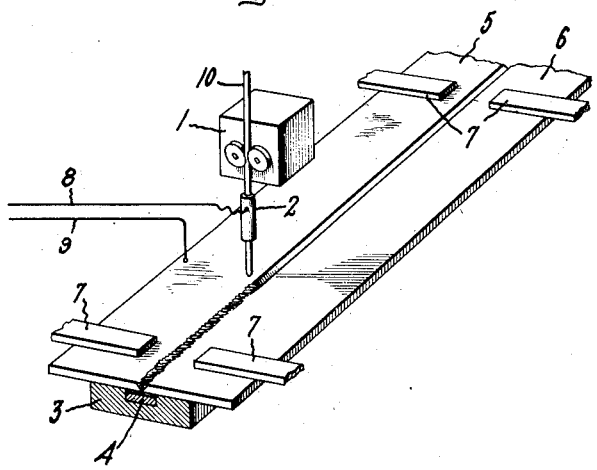
Figure 2:
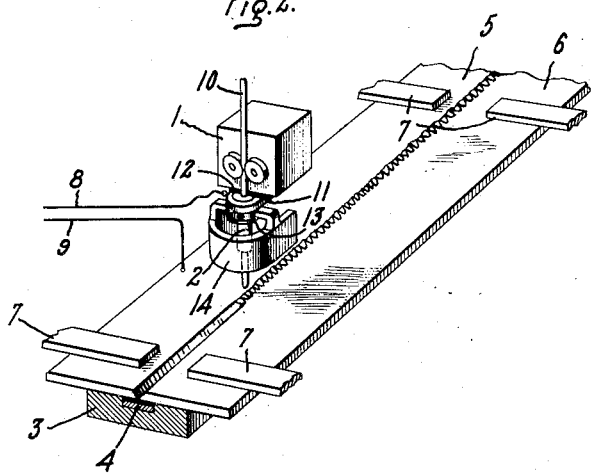

Referring to the drawing, Fig. 1 shows a welding apparatus with a backing member constructed in accordance with my invention, and Fig. 2 shows a similar apparatus with the addition of a magnetic yoke which is adjustable about the axis of the welding electrode.

Fig. 1 shows a welding apparatus comprising a welding head 1, an electrode delivery device shown as a nozzle 2, and a composite backing member constructed of a base 3 of magnetic material and an inlay 4 of material possessing high heat conductivity. The work, shown as plates 5 and 6, is held against the backing member by means of clamping members 7 or in any other suitable manner. Welding current is transmitted to the arc from a suitable source through leads 8 and 9.

Fig. 2 shows the electrode delivery nozzle 2 as attached to the welding head 1 by means of a lug 11, a strip of insulation 12 being arranged to insulate the head from the nozzle. In this modification of the invention, the nozzle 2 is provided with a flange 13 which supports a magnetic yoke 14 in a manner to permit its rotation about the axis of the electrode 10. This yoke member tends to reduce the density of the magnetic field in the air on one side of the arc and to strengthen it on the other side and thus when properly adjusted to give a more uniform magnetic pressure on opposite sides of the arc. As shown in the drawing, it is mounted around the nozzle with the open side extending in the direction toward which the arc is deflected by the magnetic field. It is rotatable so that the open end may be adjusted to point in one direction at one time and in another direction at another time for, as before noted, the unbalance of the magnetic field on the two sides of the arc may be reversed as the arc passes along the seam being such as to blow the arc forward at the beginning of the seam and backwards at the end of the seam.

The magnetic base of the backing member is preferably made of steel and the inlay or strip 4 is preferably made of copper, although the advantages of the invention are not limited to these materials. It will be observed that the slot in the base 3 is made deep enough to permit clamping of the work to the backing member without forcing it tightly against the strip 4. This arrangement is of advantage in that the air space between the strip 4 and the work prevents rapid withdrawal of heat from the work during the welding operation. A further advantage is that the space between the work and the copper strip permits the formation of a slight ridge along the lower side of the weld whereby the weld is strengthened.

Assuming the weld to have been completed from the end of the work to the point indicated by the drawing, it will be readily understood that the backing member closes the magnetic circuit in front of the arc, thus tending to equalize the magnetic field on the opposite sides of the arc and tending to stabilize the arc. The remaining inequalities in the magnetic field surrounding the arc are eliminated to a great extent by the magnetic yoke 14 which may be adjusted in a manner to accommodate the changes in the magnetic field due to changes in position of the arc on the work.

The embodiments of the invention illustrated and described herein have been selected for the purpose of clearly setting forth the principles involved. It will be apparent, however, that the invention is susceptible of being modified to meet the different conditions encountered in its use, and I therefore aim to cover by the appended claims all the modifications within the true spirit and scope of my invention.

What I claim as new and desire to secure by Letters Patent of the United States, is:—

1. In an arc welding apparatus the combination of a welding head comprising means for holding an electrode, a yoke of magnetic material mounted upon said welding head and angularly adjustable with respect thereto, arranged partially to surround the electrode, and a stationary backing member comprising a magnetic base provided with an inlay of material possessing high heat conductivity along the line of relative movement between said welding head and said member whereby inequalities in the magnetic field surrounding said arc may be corrected.

2. An electric arc welding apparatus wherein a weld is produced by relative movement between a welding arc and the work, comprising a yoke of magnetic material partially surrounding the arc and adjacent the work, said yoke being angularly adjustable about said arc whereby said yoke may be variably positioned to control the magnetic deflection of the arc by controlling the magnetic permeance around the arc.

3. In an electric arc welding apparatus wherein a weld is produced by relative movement between a welding arc and the work means for controlling the magnetic permeance about the arc comprisnig an angularly adjustable magnetic yoke member partially surrounding the arc and adjacent the work.

In witness whereof, I have hereunto set my hand this 2nd day of May, 1925.

JAMES M. WEED.